Aug. 14, 1951

F. J. GAFFNEY ET AL 2,564,000

PULSE GENERATOR SYSTEM

Filed Jan. 13, 1944

INVENTORS
WILLIAM O. REED
& FRANCIS J. GAFFNEY
BY William D. Hall
Attorney

Patented Aug. 14, 1951

2,564,000

UNITED STATES PATENT OFFICE 2,564,000

PULSE GENERATOR SYSTEM

Francis J. Gaffney, Woburn, and William O. Reed, East Walpole, Mass., assignors, by mesne assignments, to the United States of America as represented by the Secretary of War Application January 13, 1944, Serial No. 518,148

8 Claims. (Cl. 250—36)

This invention relates to a pulse generator and more particular to a circuit for generating pulses having a predetermined duration and time interval between adjacent pulses. In particular the invention contemplates a pulse generator used in connection with a rectangular wave generator to provide a control gate for setting the pulse generator on or off at times determined by the characteristics of the rectangular waves.

The system hereinafter described may find utility in various fields. Thus it is possible to use such a system in a coding system such as might be used to distinguish one landing beacon from others in a certain region. The pulse generator system may also be used, when properly calibrated, as a means for generating accurately timed pulses to function as range markers in a radar system. Other uses will occur to those skilled in the art.

The pulse generator system in its broadest aspect comprises a blocking type of oscillator associated with an open delay network so that pulses having accurately predetermined frequency and duration are generated, and controlled or gated by a control system responsive to rectangular waves.

Figure 1:
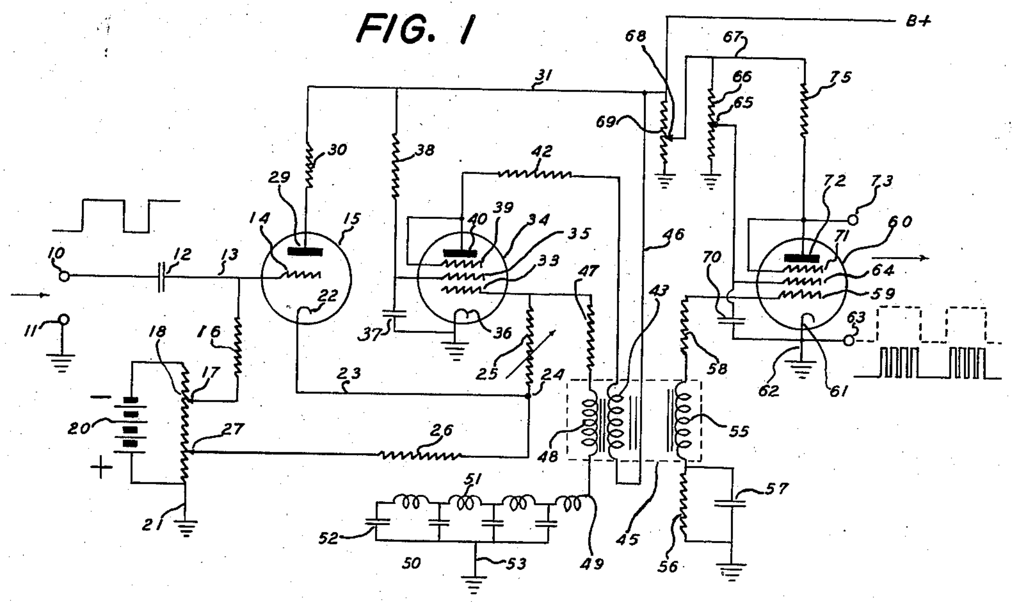
Figure 2:
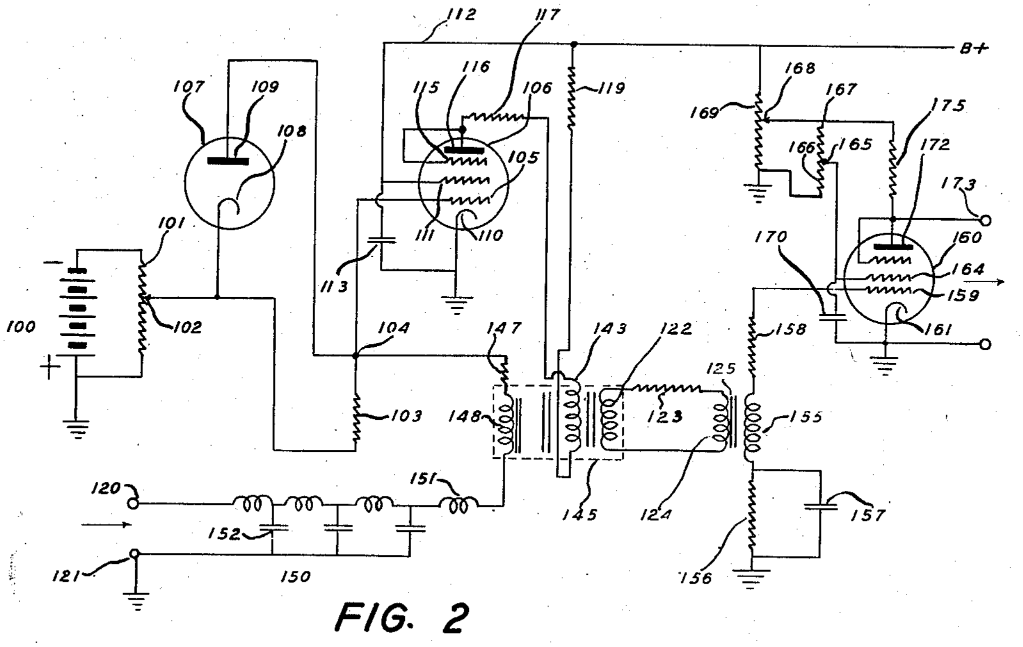

Referring now to the drawings, Figure 1 shows a circuit diagram of one form of pulse generator. Figure 2 shows a circuit diagram of a modification.

Referring first to Figure 1, the system comprises input terminals 10 and 11, the latter being grounded. Input terminal 10 is connected through a blocking condenser 12 to lead 13 going to control grid 14 of a vacuum tube 15. Lead 13 has connected thereto one terminal of a grid resistor 16 while the other terminal of said resistor is connected to sliding contact 17 of a potentiometer 18. Across the terminals of potentiometer 18 is connected a bias battery 20 with the polarity as indicated. The positive terminal of the bias system is grounded at 21.

Vacuum tube 15 has a cathode 22, of any suitable type, connected by a lead 23 to terminal 24 of a variable grid resistor 25. Terminal 24 is also connected through an isolating resistor 26 to a sliding contact 27 cooperating with potentiometer 18. Vacuum tube 15 has its anode 29 connected through a dropping resistor 30 to line 31 leading to the positive terminal of a high voltage source.

Variable grid resistor 25 is connected to the control grid 33 of a vacuum tube 34. Vacuum tube 34 may be of any type whatsoever and may have a minimum of three electrodes, these being cathode, control grid, and anode. As shown, however, the vacuum tube 34 is of the pentode type connected up as a tetrode and has characteristics suitable for use in this system. Vacuum tube 34 has its screen grid 35 and cathode 36 connected on opposite sides of a blocking condenser 37, the cathode 36 being grounded while the screen grid 35 is connected through a dropping resistor 38 to lead 31. Suppressor grid 39 and anode 40 of vacuum tube 34 are connected together to function as one electrode. This composite anode is connected through a damping resistor 42 to one secondary 43 of an iron core type of pulse transformer 45. Pulse transformers of the type indicated in 45 are well-known in the modulator art and are used in a regenerative oscillator system for creating sharp pulses. Inasmuch as the characteristics and properties of such transformers are well-known, no further description is deemed necessary. Secondary 43 of the pulse transformer goes on through a lead 46 to B+ lead 31.

Control grid 33 is connected through a small damping resistance 47 to the primary 48 of pulse transformer 45. Primary 48 is connected to one terminal 49 of a delay line 50 consisting of small inductance elements 51 and capacitance elements 52. As is evident, the inductance elements 51 are in series while the capacitance elements 52 are connected in parallel across the line in the usual ladder type of delay network. The low side of the capacitance elements are grounded at 53. The delay line is open in the sense that no terminating impedance is provided. Thus reflections may occur.

Pulse transformer 45 has an additional load secondary 55 the lower terminal of which is connected through a grid resistor 56 to ground. Grid resistor 56 is shunted by a grid condenser 57. The upper terminal of secondary 55 is connected through a damping resistor 58 to the control grid 59 of a vacuum tube 60. This tube is preferably of the same type as tube 34 and has a cathode 61 grounded at 62 to which is connected an output terminal 63. A screen grid 64 is connected to a point 65 on a grounded resistor 66 whose high terminal 67 is connected to potentiometer tap 68 operating on resistor 69 connected between B+ lead 31 and ground. Between screen grid 64 and cathode 61 is connected the customary by-pass condenser 70. Suppressor grid 71 and anode 72 are connected together to function as a composite anode. From this composite anode output terminal 73 is taken. This composite anode is connected through a load resistor 75 to potentiometer tap 68.

It should be understood that the potentials applied to the anodes of the three vacuum tubes must be carefully controlled for best results. For that reason the values of resistors 30 and 38 must be determined. In fact the voltage divider control exercised upon the electrodes of vacuum tube 60 may if desired be applied to tubes 15 and 34. The operation of this system will now be discussed and thereafter constants of an operative system will be given.

Vacuum tube 15 is normally maintained at cut-off by the application of a sufficient negative bias to its grid 14. It is assumed, however, that the rectangular voltage waves fed in from a suitable source, such as a multi-vibrator, have sufficient amplitude to raise the grid above its cut-off value. During the time that grid 14 is above its cut-off value, space current will flow through tube 15. Upon the occurrence of such space current the potential of cathode 22 will rise. This rise in potential is communicated to control grid 33 of the second vacuum tube 34 and causes this control grid to rise above its normal cut-off value, established by potentiometer tap 27. The rise in potential of control grid 33 creates a surge through primary 48 of the pulse transformer 45 to delay line 50. At the same time, space current through tube 34 is established by the rise in potential of grid 33 and this results in a surge through winding 43 of the transformer. The two windings 48 and 43 are so connected with regard to polarity that one aids the other to effect regeneration. The net effect is that the potential of grid 33 rises far above its cut-off value and a steep voltage pulse is produced. As soon as vacuum tube 34 saturates, transformer action ceases. The cessation of such action results in a reverse pulse. The delay line 50 is designed to cooperate with the rest of the system so that reflections therein tend to create sharp pulses having predetermined duration times and spaced at predetermined time intervals.

The output winding 55 of the pulse transformer may be considered as representing the load and feeding the output tube 60. The actual pulse action is determined among other things by the potential to which cathode 22 jumps when grid 14 becomes positive and the time constant of grid resistor 25 taken in conjunction with the capacitance of the delay network. Thus by increasing resistor 25 the separation between adjacent pulses may be controlled over a substantial time interval. The pulse width itself is controlled by the delay line particularly the value of the condensers used therein.

One important consideration which is inherent in all regenerative systems is the nature of the load imposed upon the regenerative system. In this particular instance the load is not only the winding 55 of the pulse transformer but also tube 60. Thus it becomes important to bias tube 60 and adjust its load resistor to such a value that the loads seen from windings 48 and 43 of the pulse transformer are suitable. Unless this output load is satisfactory, the output of the blocking oscillator is impaired.

In order to give an example of an operative system, Figure 1 will be redescribed with actual values and types of tubes. Thus vacuum tube 15 may be a 6J5 with the control grid 14 normally biased to about —35 volts through a ½ megohm resistor at 16. The potential applied to anode 29 was 150 volts. A rectangular wave having an amplitude of 75 volts with a peak duration time of 100 microseconds was applied through a .01 microfarad condenser, this being condenser 12. Tubes 34 and 60 were both 6AC7. The grid 33 of tube 34 was normally biased to —15 volts, this bias being applied through resistor 26 having a value of between 5,000 and 10,000 ohms and variable resistor 25 having a value from approximately zero ohms to 100,000 ohms. Damping resistance 47 may be of the order of about 100 ohms, while transformer 45 is the customary pulse transformer used in modulators. Plate damping resistor 42 is also low, being about 100 ohms and having 250 volts impressed thereon from line 31. Screen grid 35 was biased to 175 volts. By-pass condenser 37 may have any suitable value such as .1 microfarad.

Delay line 50 has the inductance elements each of 250 microhenries while the condensers 52 are each about 100 micro-microfarads.

Vacuum tube 60 had its control grid 59 biased by resistor 56 of .25 megohm and shunted by condenser 57 of .25 microfarad. The anode 72 of vacuum tube 60 had an adjustable potential of from zero to 250 volts, this being obtained by moving potentiometer contact 68 along resistance 69. Screen grid 64 was biased to about ⅘ of the anode potential by choosing point 68 so that 40,000 ohms above this point remain out of a total of about 190,000 ohms of resistance 66. Load resistor 75 in the anode circuit was adjusted to 300 ohms. The damping resistor 58 in the grid circuit was negligible, being of the order of 100 ohms while by-pass condenser 70 was the usual .1 microfarad condenser.

With the system as above given, a 75 volt rectangular wave could be applied at any repetition rate up to about 10,000 times per second. With a signal having the amplitude as indicated, cathode 22 rises 65 volts above its normal bias of —15 volts. When this occurs, control grid 33 rises positively from its normal cut-off bias, the rate of rise being a function of the time constant in the grid circuit. This time constant, as previously indicated, is roughly the product of the effective resistance 25 and capacitance 52 of the delay line. The remaining resistance and inductance in the grid circuit are too small to be significant. When the voltage of control grid 33 rose to about —5 volts, regeneration occurred and the blocking oscillator functioned to generate pulses. By varying grid resistor 25 over its entire range, pulse separation of between 3 microseconds to about 100 microseconds may be effected. The pulse width was approximately 1 microsecond. The repetition rate of the rectangular wave for the above value was 2,000 cycles per second. The pulse separation may be controlled by controlling the repetition rate to some extent. In order to decrease the time between adjacent pulses, the amplitude of the rectangular wave at control grid 14 must be increased or the delay line made smaller by reducing the number of sections. The pulse width itself may be shortened by reducing the value of condensers 52. The output from tube 60 is a series of squared pulses variable in amplitude up to about 80 volts.

Referring now to Figure 2, a bias battery 100 is connected across a grounded potentiometer 101, the negative terminal battery being the high side. Sliding contact 102 of the potentiometer is connected to a resistor 103 through junction point 104 and thence to control grid 105 of a vacuum tube 106. Across resistor 103 is connected a diode 107, the cathode 108 being connected to the potentiometer end of the resistor, while the anode 109 is connected to the junction point 104. Vacuum tube 106 has its cathode 110 grounded and a screen grid 111 connected to lead 112 for energizing the anode circuit. Screen grid 111 and cathode 110 have the usual by-pass condenser 113 connected across them. Suppressor grid 115 and anode 116 are connected together to form a composite anode, this latter being connected through a damping resistance 117 to the secondary 143 of a pulse transformer 145 similar to pulse transformer 45 in Figure 1. The anode circuit continues on through secondary 143, through a dropping resistor 119 to the anode supply 112.

Junction point 104 is connected through a damping resistor 147 to primary 148 of the pulse transformer and thence on through series connected inductance elements 151 to an input terminal 120. The grounded input terminal 121 has condenser elements 152 connected across to form a ladder type open delay network 150 similar to network 50 in Figure 1.

Pulse transformer 145 has the output winding 122 connected through a damping resistor 123 to the primary 124 of an isolating transformer 125. The secondary 155 of isolating transformer 153 is connected in a manner corresponding to winding 55 of Figure 1, the corresponding elements in the system having the same numbers with the addition of a hundred thereto.

The rectangular wave input may be applied directly to the delay line as shown. The diode, which in one instance was a 6H6, is connected across a resistance 103 which was fixed at 10,000 ohms. The higher the value of resistance 103, the greater the trigger voltage built up in control grid 105 of tube 106. The control grid 105 may be biased below cut-off as in Figure 1, tube 106 corresponding to tube 34 in this particular instance.

By separating the load transformer 125 from the pulse transformer 145, a greater degree of control over the value of the load in the pulse generating circuit may be secured. Thus by controlling the transformer ratio in load transformer 125 as well as by controlling the pulse of the characteristic curve upon which output to 160 operates, efficient operation of the entire system may be obtained. The control grid of output tube in either of Figures 1 or 2 may be biased at some fixed value by suitable battery.

What is claimed is:

1. A pulse generating system comprising: a blocking oscillator, said blocking oscillator including as a part thereof a vacuum tube having grid and anode circuits regeneratively coupled; an open delay line in series with one of said circuits, for providing accurate spacing for the pulses generated by said blocking oscillator; biasing means coupled to said blocking oscillator, for causing said blocking oscillator to be normally cut-off; and switching means coupled to said blocking oscillator for impressing on said blocking oscillator a series of generally rectangular control voltages having an amplitude sufficient to cause said blocking oscillator to become operative, said delay line having an electrical length such that the period of said blocking oscillator is a submultiple of the period of said control voltages.

2. The system of claim 1, further including means for varying the bias applied to said blocking oscillator.

3. The system of claim 1, wherein said delay line is in said grid circuit and wherein said rectangular control voltages are impressed upon said grid circuit to raise the potential of said grid above cut-off.

4. The system of claim 1, wherein said delay line is in said grid circuit and wherein said rectangular control voltages are impressed on said delay line.

5. The system of claim 4, further including a diode for providing a discharge path for said delay line and connected across said grid circuit.

6. A pulse generating system comprising a vacuum tube having control grid and anode circuits; biasing means coupled to said vacuum tube, for causing said vacuum tube to be normally cut-off; means including a pulse transformer connected in said two circuits, said pulse transformer providing regenerative coupling so that said vacuum tube and transformer form a blocking oscillator for generating sharp pulses; an open delay line connected in series with said grid circuit; means for impressing rectangular voltage waves on said grid circuit, said waves having a sufficiently great amplitude to swing the potential of said grid above cut-off value and controlling said blocking oscillator, said delay line having an electrical length such that the period of said blocking oscillator is a submultiple of the period of said voltage waves; an output winding on said pulse transformer and means connected to said output winding for taking off controlled, accurately spaced pulses.

7. The system of claim 6 wherein said output winding circuit includes a vacuum tube; and means for biasing said vacuum tube so that said output circuit presents a properly matched load for the blocking oscillator.

8. A pulse generating system comprising, a blocking oscillator, said blocking oscillator including as a part thereof a vacuum tube having grid and anode circuits regeneratively coupled, a delay network connected in series with one of said circuits to produce a substantially square pulse of accurately controlled duration, means normally biasing said vacuum tube to cut-off, and means to disable said last-named means for spaced intervals, said delay network having an electrical length such that the period of said blocking oscillator is a submultiple of said intervals, whereby a plurality of pulses is produced during each of said intervals.

FRANCIS J. GAFFNEY.
WILLIAM O. REED.

REFERENCES CITED

The following references are of record in the file of this patent:

UNITED STATES PATENTS

| Number | Name | Date |
|---|---|---|
| 2,110,245 | Stocker | Mar. 8, 1938 |
| 2,212,173 | Wheeler et al. | Aug. 20, 1940 |
| 2,212,420 | Harnett | Aug. 20, 1940 |
| 2,409,577 | Matson, Jr. | Oct. 15, 1946 |
| 2,436,808 | Jacobsen et al. | Mar. 2, 1948 |
| 2,444,782 | Lord | July 6, 1948 |

FOREIGN PATENTS

| Number | Country | Date |
|---|---|---|
| 578,690 | Great Britain | July 9, 1946 |